United States Patent
Davidich

(10) Patent No.: US 9,218,533 B2
(45) Date of Patent: Dec. 22, 2015

(54) METHOD AND DEVICE FOR ASSIGNING SOURCES AND SINKS TO ROUTES OF INDIVIDUALS

(75) Inventor: Maria Davidich, Neuried (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 571 days.

(21) Appl. No.: 13/285,759

(22) Filed: Oct. 31, 2011

(65) Prior Publication Data

US 2012/0105615 A1 May 3, 2012

(30) Foreign Application Priority Data

Oct. 29, 2010 (EP) .................................. EP10189396

(51) Int. Cl.
*H04N 7/18* (2006.01)
*G06K 9/00* (2006.01)

(52) U.S. Cl.
CPC .................... *G06K 9/00778* (2013.01)

(58) Field of Classification Search
CPC .......... G06K 9/00778; G06K 9/00771; G06K 9/3241; G06K 2209/23; H04H 60/33
USPC ............ 348/77, E07.085; 382/228, 236, 224, 382/128, 173, 103; 702/150
See application file for complete search history.

(56) References Cited

U.S. PATENT DOCUMENTS

| | | | |
|---|---|---|---|
| 6,072,833 A | 6/2000 | Yamauchi | 375/240.16 |
| 8,300,892 B2 * | 10/2012 | Iwasaki et al. | 382/103 |
| 2006/0158524 A1 * | 7/2006 | Yang et al. | 348/208.6 |
| 2009/0010551 A1 * | 1/2009 | Matsuda | 382/228 |
| 2010/0023249 A1 * | 1/2010 | Mays et al. | 701/200 |
| 2010/0023251 A1 * | 1/2010 | Gale et al. | 701/201 |
| 2010/0316257 A1 * | 12/2010 | Xu et al. | 382/103 |
| 2010/0322516 A1 * | 12/2010 | Xu et al. | 382/173 |
| 2011/0091073 A1 * | 4/2011 | Iwasaki et al. | 382/103 |
| 2011/0129015 A1 * | 6/2011 | Nguyen et al. | 375/240.16 |
| 2011/0199461 A1 * | 8/2011 | Horio et al. | 348/46 |

(Continued)

FOREIGN PATENT DOCUMENTS

CN 101794382 A 8/2010 ............... G06K 9/00

OTHER PUBLICATIONS

Motoharu Hosoi et al., "Dynamical Model of a Pedestrian in a Crowd", 1996 IEEE pp. 44-49.*

(Continued)

*Primary Examiner* — Mekonen Bekele
(74) *Attorney, Agent, or Firm* — Slayden Grubert Beard PLLC

(57) ABSTRACT

A method for assigning a source or a sink to a route of an individual has the steps: defining source/sink location data indicating possible sources and/or sinks in a monitored compound, monitoring a route of a moving individual in the monitored compound, generating routing data from the monitored route with initial and terminal location data. After determining an initial and/or a terminal movement vector from the initial and/or the terminal location data, a plurality of initial distance vectors between each of the source location data and the initial location data and/or a plurality of terminal distance vectors between each of the sink location data and the terminal location data are determined, which are correlated with each of the initial distance vectors and/or terminal distance vectors in order to assign respective source location data and/or sink location data to the monitored route on the basis of the correlation results.

13 Claims, 3 Drawing Sheets

(56) References Cited

U.S. PATENT DOCUMENTS

2011/0228987 A1* 9/2011 Iwasaki et al. ............... 382/107
2012/0191408 A1* 7/2012 Godin et al. .................. 702/150

OTHER PUBLICATIONS

Lucas Paletta et al., "Visual Surveillance System for Monitoring of Passenger Flows at Public Transportation Junctions"2005 IEEE., pp. 862-867.*

Sud et al., "Real-time Navigation of Independent Agents Using Adaptive Roadmaps", published on Nov. 5-7, 2007.pp. 99-107; 2007ACM.*

Fei, Weng et al., "Human Tracking in Multi-Scene Video Surveillance," Microcomputer Applications, vol. 26, No. 6, 4 pages (w/ English abstract), Aug. 27, 2010.

Chinese Office Action, Application No. 201110333687.7, 13 pages, Jan. 6, 2014.

Dee, H. et al., "How close are we to solving the problem of automated visual surveillance? A review of real-world surveillance, scientific progress and evaluative mechanisms", Machine Vision and Applications, vol. 19, No. 5-6, pp. 329-343, May 5, 2007.

Hosoi, M. et al., "Dynamical Model of a Pedestrian in a Crowd", Robot and Human Communication, $5^{th}$ Int'l Workshop on Tsukuba, Japan; pp. 44-49, Nov. 11, 1996.

Ivanov, Y., et al., "Video Surveillance of Interactions", Visual Surveillance, Second IEEE Workshop, Fort Collins, CO; XP010343133, pp. 82-89, Jun. 26, 1999.

Stauffer, C., "Estimating Tracking Sources and Sinks", Artificial Intelligence Laboratory, MIT, Proceedings of the 2003 Conference on Computer Vision and Pattern Recopition Workshop; XP031320381, 8 pages, Jun. 16, 2003.

Paletta, L. et al., "Visual Surveillance System for Monitoring of Passenger Flows at Public Transportation Junctions", Proceedings of the $8^{th}$ Int'l IEEE Conference on Intelligent Transportation Systems, Vienna, Austria; pp. 862-867, Sep. 13, 2005.

* cited by examiner

METHOD AND DEVICE FOR ASSIGNING SOURCES AND SINKS TO ROUTES OF INDIVIDUALS

CROSS-REFERENCE TO RELATED APPLICATIONS

This application claims priority to EP Patent Application No. 10189396 filed Oct. 29, 2010, the contents of which is incorporated herein by reference in its entirety.

TECHNICAL FIELD

The present invention relates to a method and a device for automatically assigning sources and sinks to detected routes or individuals in a compound with surveillance.

BACKGROUND

Pedestrian tracking is a viable tool in assessing and reconstructing information on pedestrian routes. In particular, information on from where to where pedestrians walk is necessary in a lot of applications. For example, the question of assignments to target or attraction points to which pedestrians walk and identification of sources where people spawn from is of vital importance for simulators of pedestrian streams. They model the behaviour of crowds in different infrastructures and places such as buildings, stadiums, train stations, airports and the like. The behaviour of crowds is interesting for statistical and economical purposes and above all for safety reasons. The goal is to gain better control over crowd behaviour, for example, by arranging pedestrian areas in a way that pedestrian streams are controllably and predictably steered. Simulations allow running through a number of scenarios in critical situations and finding adequate measures to avoid possible dangers, like choke points, high pedestrian densities and congestions.

The validity of these simulations may be improved by feeding them data reproducing actual and real situations. Simulations usually run in finite spaces, which in turn demands information about the sources and sinks of pedestrian streams.

Data of real situations can be obtained for example by video analysis tools that track pedestrian traces automatically. These tools save time and effort in that a multitude of pedestrians can be recognized automatically and assigned respective routes over the timeframe of the tracking, thereby quickly generating routing data of pedestrians in an observed area. Several problems that arise with the application of automated tracking include the inaccessibility of certain regions within a monitored area, the distance of regions to the tracking device which renders some pedestrians unrecognizable, the appearance of obstacles in the tracking path and similar adverse conditions.

One way to link pedestrian traces to sources and or sinks is to perform a manual assignment, in many cases based on the intuition and experience of the editor. For every pedestrian trace it has to be individually decided which source and/or sink may be assigned. Naturally, such an approach is rather ineffective for large amounts of data and pedestrian traces.

SUMMARY

According to various embodiments, a method and device for automatically assigning a source or a sink in a monitored compound to a route of an individual can be provided. According to further embodiments, an accurate assignment of sources and or sinks to routes of individuals in a compound can be provided even when the routing data can not be generated with acceptable accuracy everywhere in the compound.

According to an embodiment, a method for assigning a source or a sink to a route of an individual, may comprise: (a) defining a plurality of source location data and/or sink location data indicating possible sources and/or sinks in a monitored compound; (b) monitoring a route of a moving individual in the monitored compound; (c) generating routing data from the monitored route having initial location data and/or terminal location data; (d) determining an initial movement vector and/or a terminal movement vector from the initial location data and/or the terminal location data; (e) determining a plurality of initial distance vectors between each of the plurality of source location data and the initial location data and/or a plurality of terminal distance vectors between each of the plurality of sink location data and the terminal location data; (f) correlating the initial movement vector with each of the plurality of initial distance vectors and/or correlating the terminal movement vector with each of the plurality of terminal distance vectors in order to obtain a plurality of correlation results; and (g) assigning respective source location data and/or sink location data to the monitored route on the basis of the correlation results.

According to a further embodiment, step (f) may include normalizing each of the vectors and determining the scalar products of the normalized vectors in order to obtain the plurality of correlation results, and wherein step (g) may include assigning the source location data and/or sink location data with the largest associated scalar product obtained in step (f) to the monitored route. According to a further embodiment, source location data and/or sink location data can be excluded from the correlating step (f), if the length of their respective initial/terminal distance vector exceeds a predefined threshold value. According to a further embodiment, source location data and/or sink location data can be excluded from the correlating step (f), if the respective source or sink is not accessible from the initial/terminal location point associated with the initial/terminal location data by straight movement of the individual. According to a further embodiment, the correlation results of step can be adjusted according to the length of the initial/terminal distance vector.

According to another embodiment, a compound surveillance system may comprise a monitoring device configured to monitor a route of a moving individual on a compound and to generate routing data from the monitored route having initial location data and/or terminal location data; and
a calculation device configured to (a) determine an initial movement vector and/or a terminal movement vector from the initial location data and/or the terminal location data; to (b) determine a plurality of initial distance vectors between each of a plurality of source location data and the initial location data and/or a plurality of terminal distance vectors between each of a plurality of sink location data and the terminal location data associated with possible sources and/or sinks in the monitored compound; to (c) correlate the initial movement vector with each of the plurality of initial distance vectors and/or correlating the terminal movement vector with each of the plurality of terminal distance vectors in order to obtain a plurality of correlation results; and to (d) assign respective source location data and/or sink location data to the monitored route on the basis of the correlation results.

According to a further embodiment of the compound surveillance system, the calculation device may be further configured to normalize each of the vectors, determine the scalar products of the normalized vectors, and assign the source location data and/or sink location data with the largest associated scalar product to the monitored route. According to a further embodiment of the compound surveillance system, the calculation device can be configured to exclude source location data and/or sink location data, if the length of their respective initial/terminal distance vector exceeds a predefined threshold value. According to a further embodiment of the compound surveillance system, the calculation device can be configured to exclude source location data and/or sink location data, if the respective source or sink is not accessible from the initial/terminal point associated with the initial/terminal location data by straight movement of the individual. According to a further embodiment of the compound surveillance system, the calculation device can be configured to adjust the correlation results according to the length of the initial/terminal distance vector. According to a further embodiment of the compound surveillance system, the monitoring device can be a video camera.

BRIEF DESCRIPTION OF THE DRAWINGS

Embodiments and modifications will now be described with reference to the accompanying drawings, in which.

DETAILED DESCRIPTION

Figure 1:
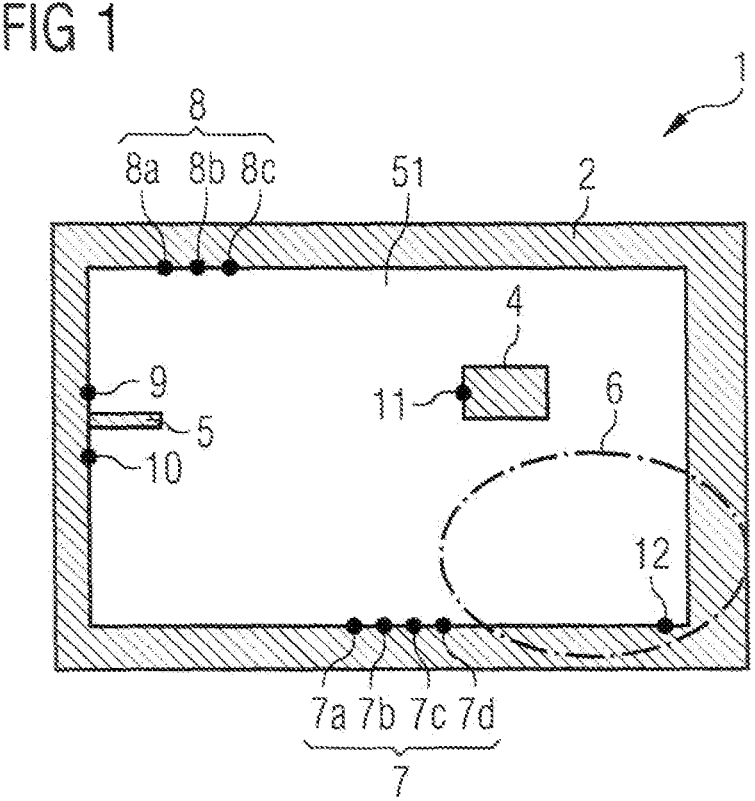
FIG. 1 shows a compound having possible sources and/or sinks according to one embodiment.

As stated above, a method for assigning a source or a sink to a route of an individual, may comprise:
 (a) defining a plurality of source location data and/or sink location data indicating possible sources and/or sinks in a monitored compound;
 (b) monitoring a route of a moving individual in the monitored compound;
 (c) generating routing data from the monitored route having initial location data and/or terminal location data;
 (d) determining an initial movement vector and/or a terminal movement vector from the initial location data and/or the terminal location data;
 (e) determining a plurality of initial distance vectors between each of the plurality of source location data and the initial location data and/or a plurality of terminal distance vectors between each of the plurality of sink location data and the terminal location data;
 (f) correlating the initial movement vector with each of the plurality of initial distance vectors and/or correlating the terminal movement vector with each of the plurality of terminal distance vectors; and
 (g) assigning respective source location data and/or sink location data to the monitored route on the basis of the correlation results.

This method advantageously provides a rule set for evaluating the likelihood with which an individual following a route has spawned from a source and/or vanished into a sink. The application of this rule set can be automated in order to quickly assess a large amount of routes generated by individuals and to assign each of the routes with the most probable source and/or sink out of a plurality of possible sources and/or sinks.

In one embodiment, step (f) includes normalizing each of the vectors and determining the scalar products of the normalized vectors, and step (g) includes assigning the source location data and/or sink location data with the largest associated scalar product obtained in step (f) to the monitored route. This advantageously allows for the quantization of a likelihood parameter associated with each of the possible sources and/or sinks.

In a further embodiment, source location data and/or sink location data are excluded from the correlating step (f), if the length of their respective initial/terminal distance vector exceeds a predefined threshold value. Moreover, in a further embodiment, source location data and/or sink location data are excluded from the correlating step (f), if the respective source or sink is not accessible from the initial/terminal location point by straight movement of the individual. These measures advantageously allow for ruling out sources and/or sinks which are too far away from the starting or ending point of a route or too complicated to reach to be considered likely as possible source or sink.

According to further embodiments, a compound surveillance system, may comprise:
a monitoring device configured to monitor a route of a moving individual on a compound and to generate routing data from the monitored route having initial location data and/or terminal location data; and
a calculation device configured to
 (a) determine an initial movement vector and/or a terminal movement vector from the initial location data and/or the terminal location data;
 (b) determine a plurality of initial distance vectors between each of the plurality of source location data and the initial location data and/or a plurality of terminal distance vectors between each of a plurality of sink location data and the terminal location data associated with possible sources and/or sinks in the monitored compound;
 (c) correlate the initial movement vector with each of the plurality of initial distance vectors and/or correlating the terminal movement vector with each of the plurality of terminal distance vectors; and
 (d) assign respective source location data and/or sink location data to the monitored route on the basis of the correlation results.

The accompanying drawings are included to provide a further understanding of embodiments. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts. Features of the various exemplary embodiments described herein may be readily combined with each other, unless specifically noted otherwise.

In this description, reference is made to "individuals". Individuals in terms of this description are understood as trackable subjects which move in or across a compound in a self-actuated and self-determined fashion. In a particular embodiment, individuals may be understood as pedestrians which move by foot. However, the concepts of various embodiments may be readily adopted to other individuals like animals, vehicles, aircrafts, mobile robots or similar subjects.

In this description, reference is made to "compounds". Compounds in terms of this description are understood as two- or three-dimensional spaces across or in which individuals may move along trackable routes. In a particular embodiment, a compound may be an enclosed two-dimensional area in or across which pedestrians may move freely. Therefore, in this example the routing data comprises two-dimensional location data of, for example, lateral positions on the floor denoted by an x- and y-component. However, the concepts of various embodiments may be readily adopted to other compounds like for example a monitored airspace, a monitored parking lot, an animal habitat, or other similar compounds. In particular, the routing data is not limited to two-dimensional location data, but may comprise three-dimensional location data as well.

Furthermore, it is made reference to "sources" and "sinks", which is to be understood as possible entrance or exit points for individuals entering or exiting the compound, i.e. predefined areas or points where a newly tracked individual in the compound may have come from or a no longer trackable individual may have went to. In a particular embodiment, sources and sinks may be entrance or exit points at the borders of a pedestrian area such as stairs, escalators, elevators, doors, hallways or similar. However, it is also possible for sources and sinks to be other compound specific entrance and exit points.

The term "monitoring a route" is used synonymous for any kind of tracking process in which individuals can be distinguished in a spatial as well as temporal fashion using sensor data gathered in a monitored compound. In a particular embodiment, a route of an individual can be monitored by detecting an individual on video data of a compound, for example taken with a stationary surveillance video camera. The individual can be tracked over time from the video data, thereby generating a trace correlating with the spatial extensions of the monitored compound. It is well known to one skilled in the art how to correlate video data, for example taken in an angle relative to the floor of the compound, with the spatial dimensions of the compound in order to generate routing data of an individual matching with the space coordinates of the compound.

In other embodiments, other sensor data can be used as basis for generating route data as well, for example infrared camera data, radar data, ultrasonic wave reflexion data or similar. It is also possible for the individuals to assist generating the routing data automatically, for example when the individuals carry detectable beacons like RFID tags, active transponders, cell phones, detectable colour markers or similar, the movement of which can be detected by matching detection devices and translated into associated routing data.

FIG. 1 shows a compound 1 according to one embodiment. The compound 1 comprises a boundary 2 surrounding an area 51. The area 51 may be a pedestrian area and the boundary 2 may comprise obstacles to pedestrian movement like walls, pillars, flower pots, fences or similar. The area 51 is not necessarily completely surrounded by hard boundaries, but instead the area 51 may be delimited by other criteria, such as the type of area, for example a monitored area relevant to security such as an event area or similar. The area 51 is an area which is monitored with a monitoring device such as a video camera in order to detect individuals in the area and to generating temporally resolved routing data of the individuals.

The area 51 may comprise obstacles within the area like the obstacle 4. Obstacle 4 may be, for example, the housing of an elevator or a breakthrough to other floors. Furthermore, area 51 may comprise an obstacle 5 such as a wall, a fence or a similar barrier.

Area 51 comprises possible sources and/or sinks for pedestrians, for example entrances or exits to the area 51. Exemplarily, possible sources and/or sinks 7, 8, 9, 10, 11 and 12 are shown. The possible sources and/or sinks have to be identified in a first step, for example based on video data of the area 51.

In the following reference is made to "sources", however, sources as used hereinforth is equally used to mean sinks as well. A possible source 7 may be a broad region in the boundary 2, for example a hallway. Since a hallway is usually broader than the routing path of an individual, source 7 may be subdivided in possible source points 7a, 7b, 7c, 7d along the width of the source 7. Source points 7a, 7b, 7c, 7d are associated with corresponding source location data in the area 51. Similarly, source 8 may be subdivided in source points 8a, 8b, 8c along the width of the source 8 in the boundary 2. Source 8 may for example be a flight of stairs. It is obvious, that sources 7 and 8 may also be provided with a respective single source point rather than a group of source points. The single source point may for example be a middle point or a geometrical centroid point.

Sources 9, 10, 11 and 12 may be narrow enough to be determined by one source location point. Sources 9, 10, 11 and 12 may for example be escalators, elevators, doors or similar narrow entrance and/or exit points. Source 12 is exemplarily shown as lying in an area 6, denoted by the dashed oval. Area 6 may be an area which is not clearly detectable by the monitoring device monitoring the area 51. For example, area 6 may be a region very far away from a video camera, where pedestrians appear as too small to be tracked reliably. Area 6 may also be an area which is not clearly visible from the monitoring device, for example due to obstacles like treetops, canopies or the like.

Figure 2:
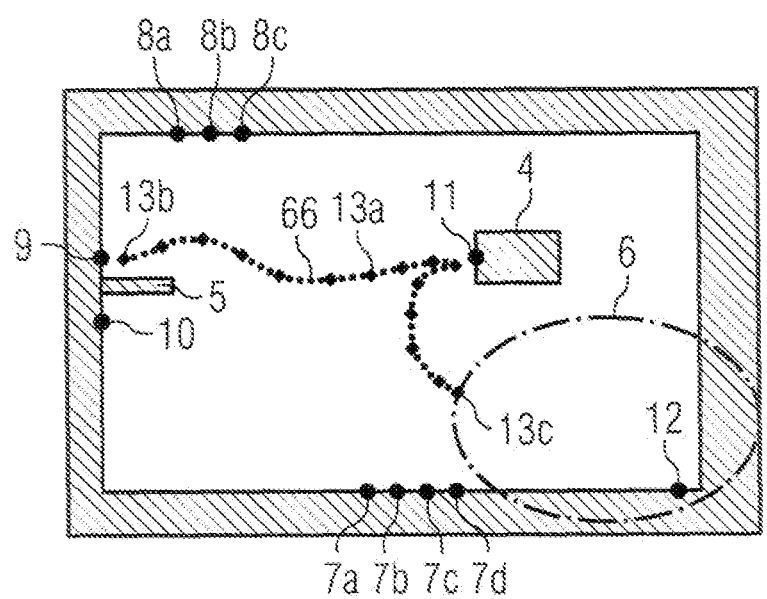
FIG. 2 shows a route of an individual in a compound according to one further embodiment.

FIG. 2 shows a route 66 of an individual in a compound according to one further embodiment. The route 66 is indicated by the dotted line and may be comprised of tracking points 13a along the route. The tracking points 13a may be calculated in the monitoring device configured to monitor area 51 or in a calculation device obtaining data from the monitoring device. The route 66 may have an initial point 13b associated with initial location data within the compound which is the first tracking point of an individual. The initial point 13b may be the first point where an individual comes into view of a video camera, for example. The route 66 may have a terminal point 13c associated with terminal location data within the compound which is the last tracking point of the individual. The terminal point 13c may be the last point where an individual has been in view of the video camera, for example. In the instant example, the terminal point 13c lies on the border of the area 6. While the individual may still be in the area 51 of the compound after the last tracking point 13c was generated, it is no longer trackable by the monitoring device since the area 6 is obstructed from view of the monitoring device or the individual becomes too small to detect reliably.

Figure 3:
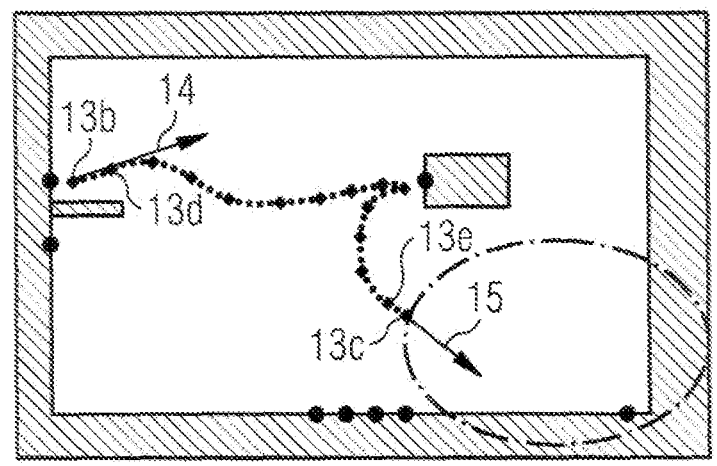
FIG. 3 shows a route of an individual and vectors in a compound according to one further embodiment.

FIG. 3 shows the route 66 of an individual in a compound with associated movement vectors according to one further embodiment. From the tracking points 13a movement vectors for the individual along the route 66 can be generated.

For example, an initial movement vector 14 is formed by determining the movement of the individual along its route 66 right after the initial tracking point 13b. In order to obtain the initial movement vector 14 a tracking point 13d in the sequence of tracking points 13a following the initial tracking point 13b may be used as tip of the initial movement vector 14, while the initial tracking point 13b itself may be used as starting point for the initial movement vector 14. The direction of the initial movement vector 14 then denotes the direction in which the individual has been moving along the route 66 at the beginning of the tracking. The length of the initial movement vector 14 may for example be chosen to correlate with the speed of the initial movement of the individual along the route 66. However, any other length for the initial movement vector 14 may be chosen as well.

It may also be possible for the tip of the initial movement vector 14 to be chosen as any other tracking point of the tracking points 13a after the initial tracking point 13b, for example a tracking point that is detected after a certain predefined time span after detection of the initial tracking point 13b has passed. Alternatively, the tip of the initial movement vector 14 can be chosen as average of multiple tracking points 13a along the route 66 after the initial tracking point 13b. It is obvious for the skilled person that multiple ways exist to determine the initial movement vector 14.

A terminal movement vector 15 is formed by determining the movement of the individual along its route 66 right before the terminal tracking point 13c. In order to obtain the terminal movement vector 15 a tracking point 13e in the sequence of tracking points 13a preceding the terminal tracking point 13c may be used as starting point of the terminal movement vector 15, while the terminal tracking point 13c itself may be used as tip for the terminal movement vector 15. The direction of the terminal movement vector 15 then denotes the direction in which the individual has been moving along the route 66 at the end of the tracking. The length of the terminal movement vector 15 may for example be chosen to correlate with the speed of the terminal movement of the individual along the route 66. However, any other length for the terminal movement vector 15 may be chosen as well. It is obvious that similar variations for a determination of the terminal movement vector 15 may apply as detailed above with regard to the initial movement vector 14.

FIG. 3 shows the route 66 of an individual in a compound with associated movement and distance vectors according to one further embodiment.

For the initial tracking point 13b initial distance vectors 16a, 16b, 16c are determined which have a starting point at one of a plurality of possible sources associated with source location data of the source points detailed with reference to FIG. 1. In the example shown here, three initial distance vectors are obtained: Initial distance vector 16a is a vector from the starting point 9, initial distance vector 16b is a vector from the starting point 8a and initial distance vector 16c is a vector from the starting point 10. All initial distance vectors 16a, 16b, 16c end at the initial tracking point 13b, therefore the direction of the initial distance vectors 16a, 16b, 16c denotes a direction of straight movement from the respective source point towards the initial tracking point 13b and the length of the initial distance vectors 16a, 16d, 16c correlates with the spatial beeline distance between the respective source point and the initial tracking point 13b. Of course, it may be possible to generate an initial distance vector for each of the identified possible sources in FIG. 1 towards the initial tracking point 13b.

In one embodiment, a group of initial distance vectors may be disregarded for the further processing. This group may consist of vectors which do not fulfil certain constraints. For example, the initial distance vector 16c may be disregarded for the further processing since the beeline path from the source point 10 to the initial tracking point 13b runs through the obstacle 5. It is therefore highly unlikely for an individual that appeared at tracking point 13b to have come from source 10, so that source point 10 can be disregarded with a sufficiently high confidence as being a possible source for the individual with the route 66. Of course, a plurality of other constraints may be taken into account as well, for example a disregard of initial distance vectors that have a length greater than a predefined threshold length.

In a similar way, terminal distance vectors 17a, 17b and 17c may be obtained by determining vectors between the terminal tracking point 13c and possible sink points. In this example, a terminal distance vector 17a is formed towards the sink point 12, a terminal distance vector 17b is formed towards the sink point 17d and a terminal distance vector 17c is formed towards the sink point 11. All terminal distance vectors 17a, 17b, 17c start at the terminal tracking point 13c, therefore the direction of the terminal distance vectors 17a, 17b, 17c denotes a direction of straight movement from the terminal tracking point 13c towards the respective sink point and the length of the terminal distance vectors 17a, 17d, 17c correlates with the spatial beeline distance between the respective sink point and the terminal tracking point 13c. Of course, it may be possible to generate a terminal distance vector for each of the identified possible sinks in FIG. 1 from the terminal tracking point 13c. It is obvious that the terminal distance vectors may be obtained mutatis mutandis with similar variations as detailed above with regard to the initial distance vectors.

For each of the determined initial distance vectors 16a, 16b, 16c a correlation is calculated with respect to the initial movement vector 14. The correlation result is to indicate a likelihood with which an associated source point may be identified as possible source for the individual along route 66 with the initial movement along the direction of the initial movement vector 14. The correlation operation may for example comprise the calculation of a dot product between the initial movement vector 14 and a respective one of the initial distance vectors.

Figure 5:
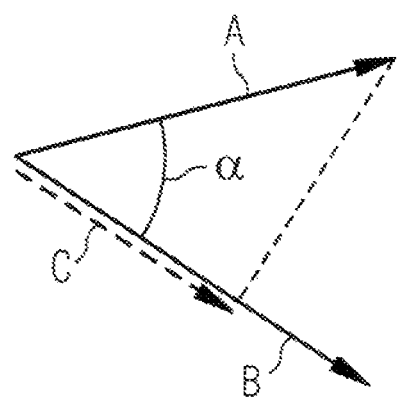
FIG. 5 shows an illustration of a scalar product of two vectors according to one further embodiment.

FIG. 5 shows the principles of a dot product as may be used herein. When calculating the dot product of a vector A with a vector B, a scalar value is obtained:

$$A \cdot B = |A| * |B| * \cos \alpha,$$

wherein |X| denotes the length of a vector X and α denotes the angle between the two vectors A and B. As shown in FIG. 5, the dot product can be interpreted as projection of the vector A onto the vector B in order to obtain a vector C the length of which is given as $$|C| = |A| * \cos \alpha.$$

If each of the vectors A and B have unitary length, the length of the vector C scales with the cosine of the angle α which is a value between −1 and 1. A value of 1 indicates that the vectors A and B are parallel and run into the same direction, a value of −1 indicates that the vectors A and B are parallel, but run into opposite directions.

In a method according to one embodiment, the initial movement vector 14 and each one of the respective initial distance vectors are normalized and a dot product is calculated in order to obtain a correlation result depending on the cosine of the angle between the two vectors. The larger the correlation result, the more likely the assignment of the respective source point as possible source to the route 66 of the individual will be. For example, the angle between the initial movement vector 14 and the initial distance vector 16a is small, therefore the likelihood that the individual with the route 66 has spawned or emerged from source 9 is fairly high.

In one embodiment, correlation results with a negative value are disregarded for the assignment of a source to the respective route of an individual. For example, the angle between the initial movement vector 14 and the initial distance vector 16b is greater than 90°, therefore the correlation result is negative. It is also fairly unlikely that the individual with the route 66 and the initial tracking point 13b has emerged from source 8 since the individual would have needed to sharply change its movement direction which usually does not comply with a natural movement, for example of a pedestrian.

As detailed above, predetermined initial distance vectors like for example the initial distance vector 16c are disregarded when calculating the correlation results.

Figure 4:
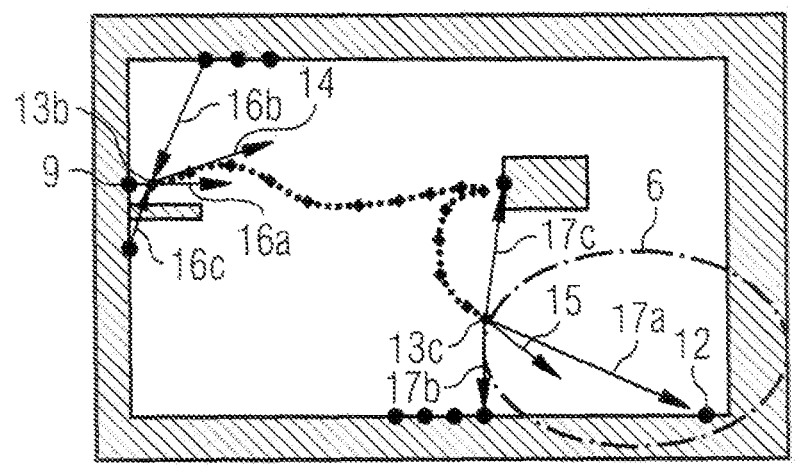
FIG. 4 shows a route of an individual and vectors in a compound according to one further embodiment.

From the plurality of correlation results a possible source is identified, for example a correlation result associated with the highest correlation value. In the example of FIG. 4, the source 9 will be assigned to route 66 as the most likely possible source for the individual with the route 66.

In a similar way, for each of the determined terminal distance vectors 17a, 17b, 17c a correlation is calculated with respect to the terminal movement vector 15. The correlation result is to indicate a likelihood with which an associated sink point may be identified as possible sink for the individual along route 66 with the terminal movement along the direction of the terminal movement vector 15. The correlation operation may for example comprise the calculation of a dot product between the terminal movement vector 15 and a respective one of the terminal distance vectors.

In a method according to one embodiment, the terminal movement vector 15 and each one of the respective terminal distance vectors are normalized and a dot product is calculated in order to obtain a correlation result depending on the cosine of the angle between the two vectors. The larger the correlation result, the more likely the assignment of the respective sink point as possible sink to the route 66 of the individual will be. For example, the angle between the terminal movement vector 15 and the initial distance vector 17a is small, therefore the likelihood that the individual with the route 66 has vanished into sink 12 is fairly high.

In one embodiment, correlation results with a negative value are disregarded for the assignment of a sink to the respective route of an individual. For example, the angle between the terminal movement vector 15 and the terminal distance vector 17c is greater than 90°, therefore the correlation result is negative. It is also fairly unlikely that the individual with the route 66 and the terminal tracking point 13c has vanished into sink 11 since the individual would have needed to sharply change its movement direction which usually does not comply with a natural movement, for example of a pedestrian.

As detailed above, predetermined terminal distance vectors like are disregarded when calculating the correlation results.

From the plurality of correlation results a possible sink is identified, for example a correlation result associated with the highest correlation value.

In one embodiment, the obtained correlation results for each of the source and/or sink points are adjusted with a distance factor that accounts for the distance between the initial or terminal tracking points and the possible source or sink points. The higher the distance between the initial or terminal tracking point and the possible source or sink point, the more unlikely it is for a source or sink to be determined as a possible source or sink. In one embodiment, the adjustment of the correlation result may be obtained as a subtraction of a value from the correlation result in order to obtain the adjusted correlation result. For example, the adjustment is performed for every distance vector that has a length which is larger than a predetermined threshold distance. In this case, a constant value may be subtracted from the correlation result in order to obtain the adjusted correlation result. It is also possible for the adjustment value to scale with the length of the respective distance vector.

In the example of FIG. 4, the distance between the terminal tracking point 13c and the sink point 12 is fairly high, especially when compared with the distance of the terminal tracking point 13c towards the sink point 7d. Although the correlation result for the terminal distance vector 17a is higher than the correlation result for the terminal distance vector 17b, the correlation result for the terminal distance vector 17a may be subject to an adjustment due to the length of the terminal distance vector 17a being above a predetermined threshold value, thus eventually lowering the value adjusted correlation result for the terminal distance vector 17a beneath the value of the correlation result for the terminal distance vector 17b. Therefore, it may be possible to determine the sink 7 to which the sink point 7d belongs as most likely sink for the route 66 of the monitored individual.

In one further embodiment, it may be possible to disregard adjustments to the correlation results when the respective possible source and/or sink points lie in an ill resolved area of the monitoring device such as the area 6 in FIG. 4 and as detailed above in conjunction with FIG. 1.

In the example of FIG. 4, the sink point 12 lies in the area 6, in which the route 66 of the individual can not reliably be tracked. Therefore, it may be reasonable to assume that the route 66 may have continued in essentially the same direction as the terminal movement vector indicates, if a tracking had been possible for the area 6. In this embodiment, an adjustment of the correlation result for the terminal distance vector 17a may be omitted due to the terminal distance vector 17a lying fully in the area 6. Although the distance between the terminal tracking point 13c and the sink point 12 is fairly high when compared to the distance between the terminal tracking point 13c and the sink point 7d, the assignment of source 12 to the route 66 appears to be the most reasonable choice.

Figure 6:
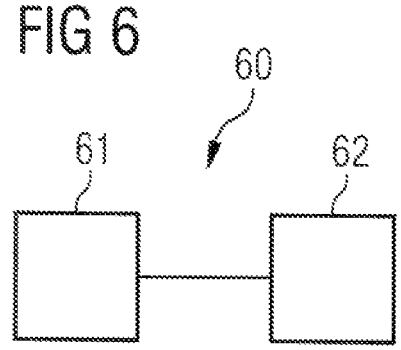
FIG. 6 shows a compound surveillance system according to one further embodiment.

FIG. 6 shows a compound surveillance system 60 according to one further embodiment. The compound surveillance system 60 comprises a monitoring device 61 which is connected to a calculation device 62. The monitoring device 61 may be configured to monitor a route of a moving individual on a compound as detailed in conjunction with FIG. 1. The monitoring device 61 may further be configured to generate routing data from the monitored route having initial location data and/or terminal location data. The routing data may in particular be similarly generated as the routing data 66 as detailed with respect to FIG. 2 above. The compound surveillance system 60 may further include a calculation device 62 configured to determine an initial movement vector and/or a terminal movement vector from the initial location data and/or the terminal location data, to determine a plurality of initial distance vectors between each of the plurality of source location data and the initial location data and/or a plurality of terminal distance vectors between each of a plurality of sink location data and the terminal location data associated with possible sources and/or sinks in the monitored compound, to correlate the initial movement vector with each of the plurality of initial distance vectors and/or correlating the terminal movement vector with each of the plurality of terminal distance vectors, and to assign respective source location data and/or sink location data to the monitored route on the basis of the correlation results. In particular, the calculation device 62 may be configured to calculate the respective vectors and correlation results in accordance with the methods described in conjunction with FIGS. 1 to 5.

Figure 7:
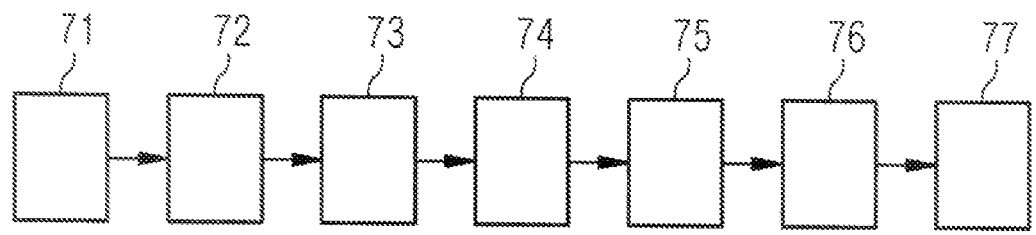
FIG. 7 shows a flow chart of a method according to one further embodiment.

FIG. 7 shows a flow chart for a method for assigning a source or a sink to a route of an individual, comprising:
- (a) in a step 71, defining a plurality of source location data and/or sink location data indicating possible sources and/or sinks in a monitored compound;
- (b) in a step 72, monitoring a route of a moving individual in the monitored compound;
- (c) in a step 73, generating routing data from the monitored route having initial location data and/or terminal location data;
- (d) in a step 74, determining an initial movement vector and/or a terminal movement vector from the initial location data and/or the terminal location data;
- (e) in a step 75, determining a plurality of initial distance vectors between each of the plurality of source location data and the initial location data and/or a plurality of terminal distance vectors between each of the plurality of sink location data and the terminal location data;
- (f) in a step 76, correlating the initial movement vector with each of the plurality of initial distance vectors and/or correlating the terminal movement vector with each of the plurality of terminal distance vectors; and
- (g) in a step 77, assigning respective source location data and/or sink location data to the monitored route on the basis of the correlation results.

The method of FIG. 7 may in particular be performed in accordance with the described processes in conjunction with FIGS. 1 to 5.

What is claimed is:

1. A method for assigning an entrance or an exit to a route of an individual, comprising:
    - (a) defining a plurality of at least one of entrance location data indicating a plurality of defined locations for entering a monitored compound and exit location data indicating a plurality of defined locations for exiting the monitored compound;
    - (b) monitoring a route of a moving individual in the monitored compound;
    - (c) generating routing data from the monitored route having at least one of initial location data and terminal location data;
    - (d) determining at least one of an initial movement vector and a terminal movement vector from at least one of the initial location data and the terminal location data;
    - (e) determining at least one of a plurality of initial distance vectors between each of the plurality of entrance location data and the initial location data and a plurality of terminal distance vectors between each of the plurality of exit location data and the terminal location data;
    - (f) at least one of: correlating the initial movement vector with each of the plurality of initial distance vectors and correlating the terminal movement vector with each of the plurality of terminal distance vectors in order to obtain a plurality of correlation results, including normalizing each of the initial movement vector and the plurality of initial distance vectors and each of the terminal movement vector and the plurality of terminal distance vectors, and
    determining (a) the scalar products of the normalized initial movement and each of the plurality of initial distance vectors and (b) the scalar products of the terminal movement vector and each of the plurality of terminal distance vectors in order to obtain the plurality of correlation results; and
    - (g) assigning at least one of respective entrance location data and exit location data to the monitored route on the basis of the correlation results, including assigning at least one of the entrance location data and exit location data with the largest associated respective scalar product obtained in step (f) to the monitored route.

2. The method according to claim 1, wherein at least one of entrance location data and exit location data are excluded from the correlating step (f), if the length of their respective initial/terminal distance vector exceeds a predefined threshold value.

3. The method according to one claim 1, wherein at least one of entrance location data and exit location data are excluded from the correlating step (f), if the respective entrance or exit is not accessible from the initial/terminal location point associated with the initial/terminal location data by straight movement of the individual.

4. The method according to claim 1, wherein the correlation results of step are adjusted according to the length of the initial/terminal distance vector.

5. A compound surveillance system, comprising
    a monitoring device configured to monitor a route of a moving individual on a compound and to generate routing data from the monitored route having at least one of initial location data and terminal location data; and
    a calculation device configured to
    - (a) determine at least one of an initial movement vector and a terminal movement vector from at least one of the initial location data and the terminal location data;
    - (b) determine at least one of:
        a plurality of initial distance vectors between the initial location data and each of a plurality of entrance location data indicating a plurality of defined locations for entering the monitored compound, and
        a plurality of terminal distance vectors between the terminal location data and each of a plurality of exit location data indicating a plurality of defined locations for entering a monitored compound;
    - (c) at least one of: correlate the initial movement vector with each of the plurality of initial distance vectors and correlate the terminal movement vector with each of the plurality of terminal distance vectors in order to obtain a plurality of correlation results, including normalization of each of the initial movement vector and the plurality of initial distance vectors and each of the terminal movement vector and the plurality of terminal distance vectors,
    determine (a) the scalar products of the normalized initial movement and each of the plurality of initial distance vectors and (b) the scalar products of the terminal movement vector and each of the plurality of terminal distance vectors; and
    - (d) assign at least one of respective entrance location data and exit location data to the monitored route on the basis of the correlation results, including assigning at least one of the entrance location data and exit location data with the largest associated respective scalar product to the monitored route.

6. The compound surveillance system according to claim 5, wherein the calculation device is configured to exclude at least one of entrance location data and exit location data, if the length of their respective initial/terminal distance vector exceeds a predefined threshold value.

7. The compound surveillance system according to claim 5, wherein the calculation device is configured to exclude at least one of entrance location data and exit location data, if the respective entrance or exit is not accessible from the initial/terminal point associated with the initial/terminal location data by straight movement of the individual.

8. The compound surveillance system according to claim 5, wherein the calculation device is configured to adjust the correlation results according to the length of the initial/terminal distance vector.

9. The compound surveillance system according to claim 5, wherein the monitoring device is a video camera.

10. A method for assigning an entrance or an exit to a route of an individual, comprising:
 (a) defining a plurality of entrance location data indicating a plurality of defined locations for entering a monitored compound or a plurality of exit location data indicating a plurality of defined locations for exiting the monitored compound;
 (b) monitoring a route of a moving individual in the monitored compound;
 (c) generating routing data from the monitored route having initial location data or terminal location data;
 (d) determining at least one of an initial movement vector and a terminal movement vector from the initial location data or the terminal location data;
 (e) determining a plurality of initial distance vectors between each of the plurality of entrance location data and the initial location data or a plurality of terminal distance vectors between each of the plurality of exit location data and the terminal location data;
 (f) correlating the initial movement vector with each of the plurality of initial distance vectors or correlating the terminal movement vector with each of the plurality of terminal distance vectors in order to obtain a plurality of correlation results, including normalizing each of the initial movement vector and the plurality of initial distance vectors and each of the terminal movement vector and the plurality of terminal distance vectors,
 determining (a) the scalar products of the normalized initial movement and each of the plurality of initial distance vectors and (b) the scalar products of the terminal movement vector and each of the plurality of terminal distance vectors in order to obtain the plurality of correlation results; and
 (g) assigning respective entrance location data or exit location data to the monitored route on the basis of the correlation results, including assigning the entrance location data or exit location data with the largest associated respective scalar product obtained in step (f) to the monitored route.

11. The method according to claim 10, wherein entrance location data or exit location data are excluded from the correlating step (f), if the length of their respective initial/terminal distance vector exceeds a predefined threshold value.

12. The method according to one claim 10, wherein entrance location data or exit location data are excluded from the correlating step (f), if the respective entrance or exit is not accessible from the initial/terminal location point associated with the initial/terminal location data by straight movement of the individual.

13. The method according to claim 10, wherein the correlation results of step are adjusted according to the length of the initial/terminal distance vector.

* * * * *